(12) United States Patent
Wang et al.

(10) Patent No.: US 8,238,339 B1
(45) Date of Patent: Aug. 7, 2012

(54) METHOD AND APPARATUS FOR SELECTIVE PACKET DISCARD

(75) Inventors: Chi-Lie Wang, Milpitas, CA (US); Jason Z Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 351 days.

(21) Appl. No.: 12/712,477

(22) Filed: Feb. 25, 2010

(51) Int. Cl.
*H04L 12/28* (2006.01)
*H04L 12/50* (2006.01)
*G08C 25/02* (2006.01)
*G06F 11/30* (2006.01)

(52) U.S. Cl. ........ 370/392; 370/369; 370/389; 714/746; 714/748

(58) Field of Classification Search .................. None
See application file for complete search history.

(56) References Cited

U.S. PATENT DOCUMENTS

| | | | |
|---|---|---|---|
| 7,031,258 B1 * | 4/2006 | Frisch et al. | 370/235 |
| 7,106,742 B1 * | 9/2006 | Frisch et al. | 370/394 |
| 2002/0003777 A1 * | 1/2002 | Miyamoto | 370/236 |
| 2003/0039254 A1 * | 2/2003 | Ohnishi | 370/395.42 |
| 2010/0302982 A1 * | 12/2010 | Hsu et al. | 370/311 |

* cited by examiner

*Primary Examiner* — Gary Mui
*Assistant Examiner* — Hicham Foud
(74) *Attorney, Agent, or Firm* — Heimlich Law, PC; Alan Heimlich, Esq.

(57) ABSTRACT

A method and apparatus for selective packet discard have been disclosed where two bits are added to a packet to indicate various discard options.

14 Claims, 12 Drawing Sheets

901 Forwarding a packet as soon as a start of packet (SOP) is received.

902 Forwarding a packet as soon as a start of packet (SOP) is received wherein said forwarding begins at an input buffer (IB) and said forwarding next goes to a crosspoint buffer (CB).

903 Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB).

904 Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising adding two bits to said packet at said IB.

905 Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising adding two bits to said packet at said IB further comprising using said two bits to discard a packet based on said two bits.

906 Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising adding one or more bits to said packet at said IB and using said one or more bits to discard said packet at said FB.

907 Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising adding two bits to said packet at said IB further comprising using said two bits to discard a packet based on said two bits wherein said using occurs in said FB.

908 Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising embedding said IB in an Ingress Port, embedding said CB in a Switch Fabric, and embedding said FB in an Egress Port.

1009
adding two bits to a packet; and selectively discarding said packet based on said two bits.

1010
adding two bits to a packet; and selectively discarding said packet based on said two bits further comprising: generating a STOMP signal; and sending said STOMP signal to a link partner.

1011
adding two bits to a packet; and selectively discarding said packet based on said two bits further comprising: generating a STOMP signal; and sending said STOMP signal to a link partner 10 further comprising releasing a buffer memory based on said two bits.

1012
adding two bits to a packet; and selectively discarding said packet based on said two bits further comprising: generating a STOMP signal; and sending said STOMP signal to a link partner further comprising releasing a buffer memory based on said two bits further comprising releasing a buffer memory in response to a response from said link partner.

1013
adding two bits to a packet; and selectively discarding said packet based on said two bits further comprising: generating a STOMP signal; and sending said STOMP signal to a link partner further comprising releasing a buffer memory based on said two bits further comprising releasing a buffer memory in response to a response from said link partner wherein said response comprises a not acknowledge (NACK) and an acknowledgement identification (ackID).

1014
adding two bits to a packet; and selectively discarding said packet based on said two bits further comprising: generating a STOMP signal; and sending said STOMP signal to a link partner further comprising releasing a buffer memory based on said two bits further comprising releasing a buffer memory in response to a response from said link partner wherein said response comprises a not acknowledge (NACK) and an acknowledgement identification (ackID) wherein said releasing said buffer memory in response to said response from said link partner is based on a combination consisting of said NACK, said ackID, and NACK and ackID.

1100

1120
forwarding a packet through a switch as soon as a Start Of Packet delimiter (SOP) is received for said packet; inserting one or more discard bits at an End of Packet (EOP) cycle for said packet wherein said one or more discard bits request said packet cancellation upon a condition selected from the group consisting of a pattern not match with trace enabled, a pattern match with packet filter enabled, and any detected error; storing said one or more discard bits in a memory, wherein said storing is to a memory location indexed through a transmitted packet index; generating a STOMP Control Symbol based on said one or more discard bits and a configuration of said EP, wherein said STOMP Control Symbol requests a Link Partner to cancel said packet; receiving from said Link Partner a Not Accepted Control Symbol (NACK) along with an ACK ID; and retrieving said stored said one or more discard bits from said memory; comparing said retrieved said stored said one or more discard bits from said memory against said configuration of said EP; and releasing said memory used to store said one or more discard bits and discarding said packet.

1121
further comprising: receiving said packet on an n-port Switch, said n-port switch consisting of n Ingress Ports (IP) wherein each of said n IP has an Input Buffer (IB) for said packet reception; storing said received packet into one of said n IB; forwarding said received packet to one or more n Crosspoint Buffers (CB), wherein each of said n CB corresponds to a corresponding n Egress Port; forwarding said received packet from said one or more n CB through one or more said n Egress Port to one or more Link Partner, wherein each of said n Egress Port has a Final Buffer.

1122
wherein said pattern not match with trace enabled, and said pattern match with packet filter enabled, and said any detected error are performed after said SOP received for said packet.

1130
wherein said one or more discard bits are discard_normal and discard_trace and wherein said storing is during a time when said packet is being transmitted out of said EP and wherein said storing is selected through said transmitted packet index for a transmitted said packet.

1133
wherein said one or more discard bits are two bits denoted discard_trace and discard_normal and wherein said switch has one or more ports.

1131
further comprising: generating said Not Accepted Control Symbol (NACK) and said ACK ID in response to said Link Partner receiving said STOMP Control Symbol, wherein said ACK ID is a packet index; and requesting retransmission of said packet based upon said packet index.

1132
wherein retrieving said stored said one or more discard bits from said memory is from said EP based upon said packet index; and wherein said releasing said memory used to store said one or more discard bits and discarding said packet is based upon a logic condition selected from the group consisting of discard_trace is set and said EP is configured as a trace port, discard_normal is set and said EP is not configured as a trace port, and discard_trace is set and discard_normal is set.

1220
forwarding a packet through a switch as soon as a Start Of Packet delimiter (SOP) is received for said packet; inserting one or more discard bits at an End of Packet (EOP) cycle for said packet wherein said one or more discard bits request said packet cancellation upon a condition selected from the group consisting of a pattern not match with trace enabled, a pattern match with packet filter enabled, and any detected error; storing said one or more discard bits in a memory, wherein said storing is based on said one or more discard bits and configuration of an Egress Port (EP) and said one or more discard bits are indexed through a transmitted packet index; generating a STOMP Control Symbol based on said one or more discard bits and said configuration of said EP, wherein said STOMP Control Symbol requests a Link Partner to cancel said packet; receiving from said Link Partner a Not Accepted Control Symbol (NACK) along with an ACK ID; and retrieving said stored said one or more discard bits from said memory; comparing said retrieved said stored said one or more discard bits from said memory against said configuration of said EP; and releasing said memory used to store said one or more discard bits and discarding said packet.

---

1221
further comprising: receiving said packet on an n-port Switch, said n-port switch consisting of n Ingress Ports (IP) wherein each of said n IP has an Input Buffer (IB) for said packet reception; storing said received packet into one of said n IB; forwarding said received packet to one or more n Crosspoint Buffers (CB), wherein each of said n CB corresponds to a corresponding n Egress Port; forwarding said received packet from said one or more n CB through one or more said n Egress Port to one or more Link Partner, wherein each of said n Egress Port has a Final Buffer.

---

1223
wherein said configuration of an Egress Port is selected from the group consisting of a normal forwarding port, and a trace port.

---

1224
further comprising: setting a discard_trace bit when said condition pattern not match with trace enabled exists; and discarding said received packet forwarded to said trace port when said discard_trace bit is set.

1225
further comprising: setting a discard_normal bit when said condition pattern match with packet filter enabled exists; and discarding said received packet forwarded to said normal forwarding port when said discard_ normal bit is set.

1226
further comprising: setting a discard_normal bit when said condition any detected error exists; setting a discard_trace bit when said condition any detected error exists; discarding said received packet forwarded to said trace port when said discard_trace bit is set and said discard_trace bit is set; and discarding said received packet forwarded to said normal forwarding port when said discard_trace bit is set and said discard_trace bit is set.

---

1227
further comprising: transmitting said generated STOMP Control Symbol from said EP to said Link Partner after said packet has been transmitted from said EP to said Link Partner.

1228
further comprising: transmitting said generated STOMP Control Symbol from said EP to said Link Partner after said packet has been transmitted from said EP to said Link Partner.

1229
further comprising: transmitting said generated STOMP Control Symbol from said EP to said Link Partner after said packet has been transmitted from said EP to said Link Partner.

FIG. 12

METHOD AND APPARATUS FOR SELECTIVE PACKET DISCARD

RELATED APPLICATION

This application is related to application Ser. No. 12/712,516 filed this same date by the same inventors titled "Method and Apparatus for Dynamic Traffic Management with Packet Classification", which is hereby incorporated herein by reference in its entirety including all incorporated references therein. This application is related to application Ser. No. 12/712,560 filed this same date by the same inventors titled "Method and Apparatus for Congestion and Fault Management with Time-to-Live", which is hereby incorporated herein by reference in its entirety including all incorporated references therein.

FIELD OF THE INVENTION

The present invention pertains to switches. More particularly, the present invention relates to a method and apparatus for selective packet discard. More specifically, the present invention relates to a method and apparatus for selective discard using 2 bits no matter how many ports a switch configuration has.

BACKGROUND OF THE INVENTION

Switches are widely used in systems. For example, the Serial Rapid Input Output (sRIO) Gen2 Switch may be used to meet wireless infrastructure customer's requirements for WCDMA/LTE Base Stations.

Some of these requirements are challenging, for example, an 18-port Serial Rapid IO (sRIO) Gen2 Switch may be required to achieve very high performance (up to 360 Gbit) with minimum packet latency (<30 ns excluding sRIO protocol stack delay) across Switch Fabric to meet wireless infrastructure customer's requirements for WCDMA/LTE Base Stations.

In order to ensure that only the good packets will be forwarded to their destinations though Serial Rapid IO Gen2 switches, store and forward mode can be used to store a complete packet first then start forwarding if all of the following conditions are met: 1) No error being detected upon packet reception, and 2) No pattern matched while packet filtering is enabled. If a pattern is matched while trace is enabled, the above scheme can guarantee the integrity of packet forwarding but incurs long packet latency while transported through Switch Fabric especially for larger size packets with Buffered Crossbar Switch architecture. This presents a problem as certain applications cannot tolerate long packet latency.

Additionally, current approaches require the same number of bits for a discard as the width of a switch, for example, an 18-port Serial Rapid Input Output (sRIO) Gen2 Switch requires 18 bits. This presents a problem as many memory buffers are needed for buffered crossbar switch and more memory bits required for storing discard information increases product cost significantly.

BRIEF DESCRIPTION OF THE DRAWINGS

The invention is illustrated by way of example and not limitation in the figures of the accompanying drawings in which:

FIG. 9 illustrates various embodiments of the invention;

FIG. 10 illustrates various embodiments of the invention;

FIG. 11 illustrates various embodiments of the invention; and

FIG. 12 illustrates various embodiments of the invention;

DETAILED DESCRIPTION

Figure 1:
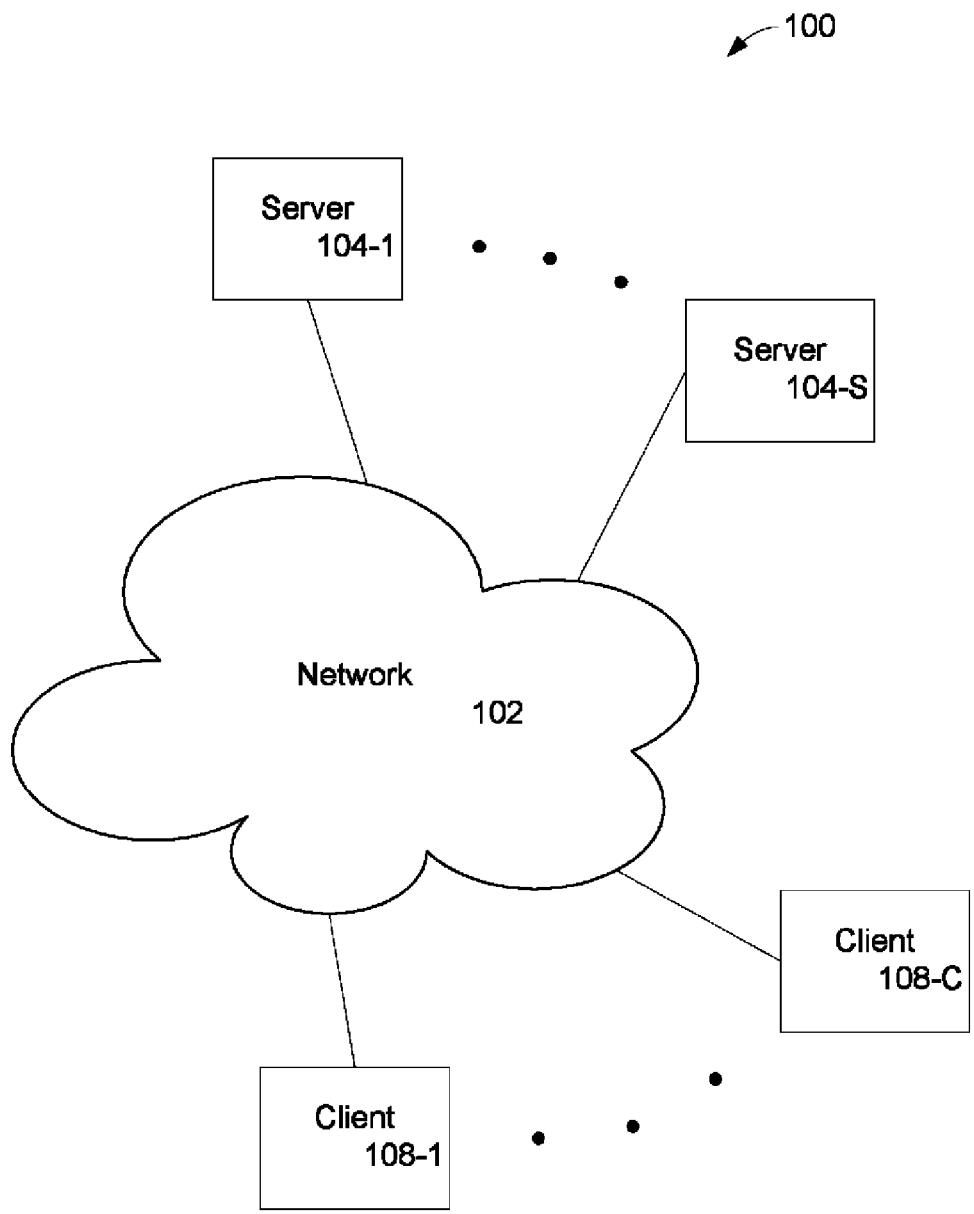
FIG. 1 illustrates a network environment in which the method and apparatus of the invention may be implemented.

For illustration purposes, the techniques of the present invention will be illustrated using an 18-port Serial Rapid IO (sRIO) Gen2 Switch. The techniques may be applied to other switches and other scenarios. In one embodiment of the invention, an 18-port Serial Rapid IO (sRIO) Gen2 Switch is to be implemented to achieve very high performance (up to 360 Gbit) with minimum latency (<30 ns excluding sRIO protocol stack delay) to meet wireless infrastructure customer's requirements for WCDMA/LTE Base Stations.

In order to achieve minimum cut-through latency, the present invention in one embodiment uses cut-through (or cut through) with selective discard which can be used to minimize packet latency especially when trace and packet filter are enabled or when an error is being detected. This scheme allows packet forwarding as soon as Start of Packet Delimiter (SOP) is being received at an Ingress Port. If trace is enabled with pattern not match, packet filter enabled with pattern match, or any error being detected during packet reception, packet discard will be activated by appending discard indication to cancel the packet. The appended discard indication will travel through Switch Fabric to Egress Port. Based on an Egress Port's configuration (as a trace port or not), a STOMP (or stomp) control symbol can be sent out to a Link Partner to request packet discard. For an 18-port switch, 18 discard bits would normally be needed to specify which ports that the packet being forwarded to require packet cancellation, however based on the present invention, in one embodiment only 2 discard bits are used to store packet discard indication instead of 18-bits. For a Buffered Crossbar architecture which consists of many memory buffers, less memory bits to be used for storing discard information allows a product to be developed with lower cost.

In one embodiment the invention can forward a packet through a sRIO Gen2 Switch as soon as the SOP cycle is detected.

In one embodiment the invention can perform packet filter and trace match functions which may require additional cycles based on pattern setting. If a packet filter pattern match or trace pattern not match, then the forwarded packet can be discarded.

In one embodiment of the invention, you can set normal forwarding port discard bit to discard the packets to be forwarded to the normal ports upon packet filter match.

In one embodiment of the invention, you can set trace port discard bit to discard the packet to be traced to trace port upon trace pattern not match.

In one embodiment the invention can perform error checking (CRC, alignment, etc) and set both normal port discard bit and trace port discard bit to discard the packets to normal forwarding port and trace port if there is any error being detected.

In one embodiment the invention after the received packet being forwarded through the Switch Fabric to the Egress Port, the Egress logic will check the discard bits against its port configuration. If the Egress Port is configured as a normal forwarding port, it will generate a STOMP control symbol to discard the packet if normal port discard bit is set. Otherwise, for trace port configuration, it will generate a STOMP control symbol to discard the packet if trace port discard bit is set. In the case where both normal port discard bit and trace port discard bit are set, a STOMP control symbol will be generated no matter what the port's configuration.

In one embodiment the invention upon receiving a STOMP control symbol, Link Partner will return Packet Not Acceptable control symbol (NACK) to request packet retransmission per sRIO the specification, however, the packet will be discarded therefore retransmission is not necessary.

In one embodiment the invention while the packet is being transmitted out of the Egress Port, its corresponding discard bits will be stored into Packet Discard Mapper being selected through the Packet Index for the transmitted packet. While NACK is returned from Link Partner, the returned ACKID (Packet Index) will be used to perform table look-up and retrieve the stored packet discard information. If the packet needs to be discarded, the memory buffer will be released for future use.

In one embodiment of the invention minimum packet latency can be achieved in cut-through mode as the packet will be forwarded as soon as SOP is received at Ingress and gets discarded if packet forwarding or tracing is determined to be not required at a later time.

In one embodiment of the invention lower memory cost is accomplished with 2 discard bits. Otherwise, 18 discard bits would be needed which could increase product cost as in Buffered Crossbar Switch architecture, total of 3762 memory pages with 35 entries each would be needed to achieve the desired throughput. If each entry needs 18-bits to support packet discard, it would require nearly 10 times the memory versus the current invention (2,370,060 bits vs. 263,340 bits). In addition, more memory with wider data paths would be more difficult to route therefore increasing the die size and decreasing performance.

Figure 3:
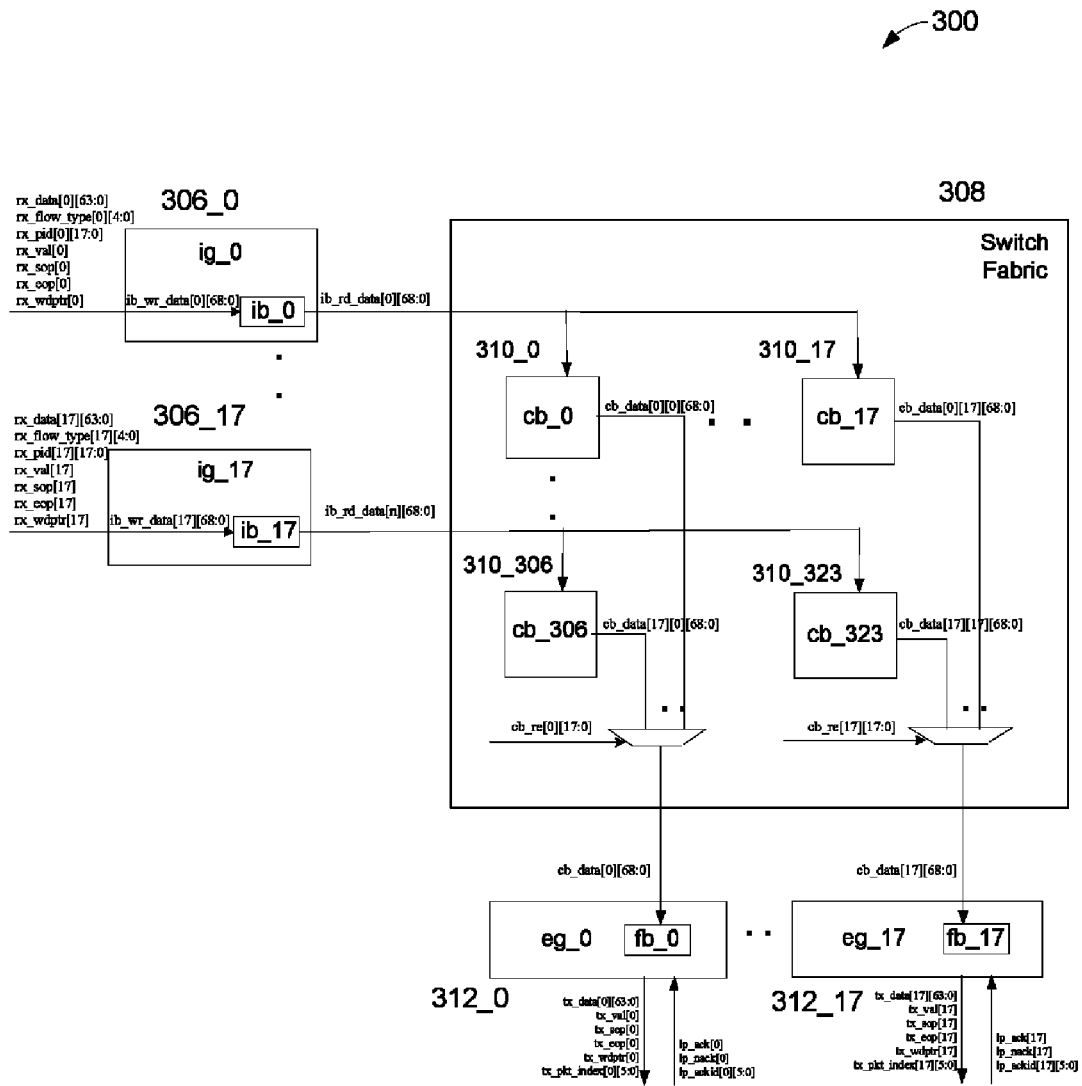
FIG. 3 illustrates one embodiment of the invention showing a data path within a switch.

FIG. 3 illustrates, generally at 300, one embodiment of the invention showing a Switch Data Path for an 18-port Buffered Crossbar Switch, it consists of 18 Ingress Ports and each has an Input Buffer (IB) for packet reception. The received packet being stored into Input Buffer will be forwarded to one or multiple (for multicast support) of the 18 Crosspoint Buffers (CB) within a given row that corresponding to 18 Egress Ports. Total of 324 (18×18) CBs will be constructed within Switch Fabric. There are 18 Egress Ports and each has a Final Buffer (FB) that receives the forwarded packet from one of the 18 CBs within a given column that corresponding to 18 Input Ports.

In FIG. 3, at 306_0 through 306_17 are ingress ports (ig_0 through ig_17) each receiving a variety of inputs such as receive data (rx_data[p][63:0]), receive flow type (rx_flow_type[p][4:0]), receive destination port ID (rx_pid[p][17:0]), receive valid cycle (rx_val[p]), receive start of packet (rx_sop[p]), receive end of packet (rx_eop[p]), receive word pointer (rx_wdptr[p]), where p denotes the ingress port number (0 through 17). These inputs are for illustration and are not germane to understanding the invention beyond the concept that there is data received with a priority and it is switched. Each ingress port has an ingress buffer denoted ib_0 through ib_17 and receives an input denoted ib_wr_data[p][68:0], where again p refers to the port number. ib_wr_data[p][68:0] consists of the receive data, rx_data[p][63:0], and for example bit 64 being rx_sop[p], bit 65 being rx_eop[p], bit 66 being rx_wdptr[p], and bits 67 and 68 being reserved. Each an ingress buffer denoted ib_0 through ib_17 can be read and will output buffered data denoted ib_rd_data[p][68:0], where again p refers to the port number. ib_rd_data[p][68:0] consists of the receive data, rx_data[p][63:0], and for example bit 64 being rx_sop[p], bit 65 being rx_eop[p], bit 66 being rx_wdptr[p], and bits 67 and 68 being reserved.

In FIG. 3, at 308 is a switch fabric, having 310_0 through 310_323 crosspoint buffers denoted cb_0 through cb_323.

In FIG. 3, at 312_0 through 312_17 are egress ports (eg_0 through eg_17) each receiving a variety of inputs from the switch fabric 308 (cb_data[q][68:0]), where q denotes the egress port number (0 through 17). Each egress port has an egress buffer denoted fb_0 through fb_17. Each egress port has outputs, for example, transmit data (tx_data[q][63:0]), transmit valid cycle (tx_val[q]), transmit start of packet (tx_sop[q]), transmit end of packet (tx_eop[q]), transmit word pointer (tx_wdptr[q]), and transmit packet index (tx_pkt_index[q][5:0]), where q denotes the egress port number (0 through 17). Each egress port also has inputs received from a link partner, for example link partner ack (lp_ack[q]), link partner nack (lp_nack[q]), and link partner ack ID (lp_ackid[q][5:0]) where again q denotes the egress port number (0 through 17).

In one embodiment of the invention, while the packet is being received into Ingress Port's IB, a set of pre-programmed pattern(s) can be used to compare against the incoming packet's header/payload if packet filter and/or trace function is enabled. Since the received packet has been forwarded to the CB as soon as SOP is received, the forwarded packet may need to be discarded if packet filtering is enabled with pattern match (by setting discard_normal), trace is enabled with pattern not match (by setting discard_trace), or any error being detected upon packet reception (by setting both discard_normal and discard_trace). These two bits will be appended into higher 2 bits of the packet forwarding data path and traveling through IB, CB to FB. Upon receiving this packet at Egress Port, it can start forwarding the packet out to its Link Partner and at the same time; store the discard information into Packet Discard Mapper. It will then based on its port configuration and the discard bit setting to generate a STOMP control symbol for requesting packet cancellation. After Link Partner returns Packet Not Acceptable control symbol (NACK), the stored packet discard information will be retrieved to be used for determining whether the memory buffer being used to store this packet can be released.

In one embodiment of the invention, while the packet is being received into the Ingress Port, rx_data[63:0] is for packet data, rx_pid[17:0] indicates which Egress Port that the packet shall be forwarded to, rx_flow_type[4:0] is for packet type (VC0 with different priority level along with VC1/VC5), rx_val indicates a valid data cycle, rx_sop is for Start of Packet Delimiter, rx_eop is for End of Packet Delimiter and rx_wdptr is for packet word boundary indication. This information will be stored into IB along with packet discard indication while the packet is being received at Ingress Port. When the stored packet is being read out of IB, the lower 64-bit (ib_rd_data[63:0]) are for packet data, ib_rd_data[64]

is the stored SOP, ib_rd_data[65] is the stored EOP, ib_rd_data[66] is the stored word pointer, ib_rd_data[67] is the stored normal port discard bit and ib_rd_data[68] is the stored trace port dicard bit. The information can be used to control packet write, read and discard while traveling through CB and FB to be transmitted out of Egress Port.

Figure 4:
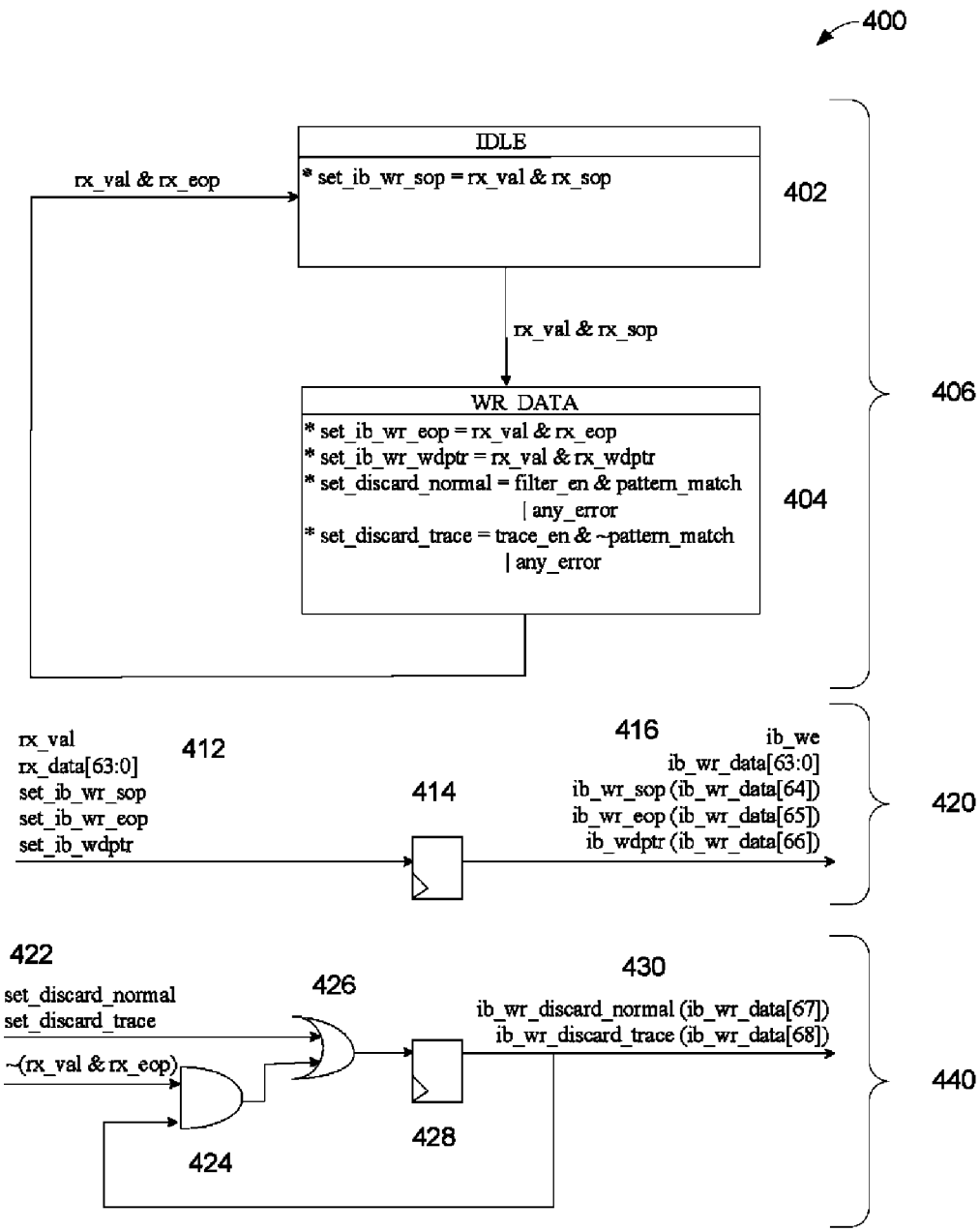
FIG. 4 illustrates one embodiment of the invention showing packet write to input buffer with discard generation.

FIG. 4 illustrates, generally at 400, one embodiment of the invention showing Packet Write to IB with Discard Generation. In one embodiment of the invention, while a packet is being received from Ingress, packet discard generation will be invoked. After SOP is being detected, set_ib_wr_sop will be asserted which can be used to generate ib_wr_sop to be written into IB and allow the received packet to be forwarded from Ingress, Crosspoint Buffer through Egress to minimize packet latency. If packet filter is enabled, packet header will be parsed against a set of patterns. If any of the patterns is being matched, the packet shall be discarded from the normal forwarding port as the packet has already been forwarded through Switch Fabric. set_discard_normal will be set, which can be used to set ib_wr_discard_normal bit at EOP cycle. Upon receiving this packet, Egress Port will check this bit and generate STOMP control symbol to cancel the packet from the normal forwarding port.

In one embodiment of the invention, if trace is enabled, packet header will be parsed the same way against the same set of patterns. If none of the patterns is being matched, the packet will be discarded from the trace port as it has already been forwarded through Switch Fabric. set_discard_trace will be set, which can be used to set ib_wr_discard_trace bit at EOP cycle. Upon receiving this packet, Egress Port will check this bit and generate STOMP control symbol to request packet cancellation from the trace port (if port is configured as trace port).

In one embodiment of the invention, while the packet is being received through Ingress, error detection will also be performed. Some of the errors (for example, but not limited to, 8b10b, alignment, etc) can be detected during packet reception and other type error (for example, but not limited to, CRC, etc.) may occur at the end of the packet reception. In either case, both set_discard_normal and set_discard_trace bits will be set, which can be used to generate ib_wr_discard_normal and ib_wr_discard_trace bits at EOP cycle. Upon receiving this packet, Egress Port will check these bits and generate STOMP control symbol to request packet cancellation from both normal forwarding port and trace port.

In one embodiment of the invention, when EOP cycle is being detected to indicate that the current packet has been completed received at Ingress. set_rx_eop will be asserted to generate ib_wr_eop and mark the end of the packet. set_tx_wdptr will also be generated for packet word alignment indication.

In one embodiment of the invention, ib_we will be generated through pipelining rx_val. This signal will be used to write ib_wr_data[68:0] to Input Buffer.

At 406 is logic having block 402 (IDLE) and 404 (WR_DATA). Within each block 402 and 404 are logic equations representing the generation of real-world signals. As may be seen in block 402, if rx_val & rx_sop are asserted, it will enter block 404. In block 404, if rx_val & rx_eop are asserted it will enter block 402. As previously noted rx_val denotes a valid receive data cycle, rx_sop denotes a receive start of packet delimiter, and rx_eop denotes a receive end of packet delimiter. The notation of & is known to one of skill in the art as the AND operation. Likewise, other standard logic notations are shown (such as, but not limited to |, ~, etc.) as are standard logic symbols for functions in other parts of FIG. 4 as well as in other Figures.

At 420 is logic which takes as inputs 412, processes it through logic block 414, and generates outputs 416.

At 440 is logic which takes as inputs 422, processes it through logic blocks 424, 426, and 428 as shown, and generates outputs 430.

Figure 5:
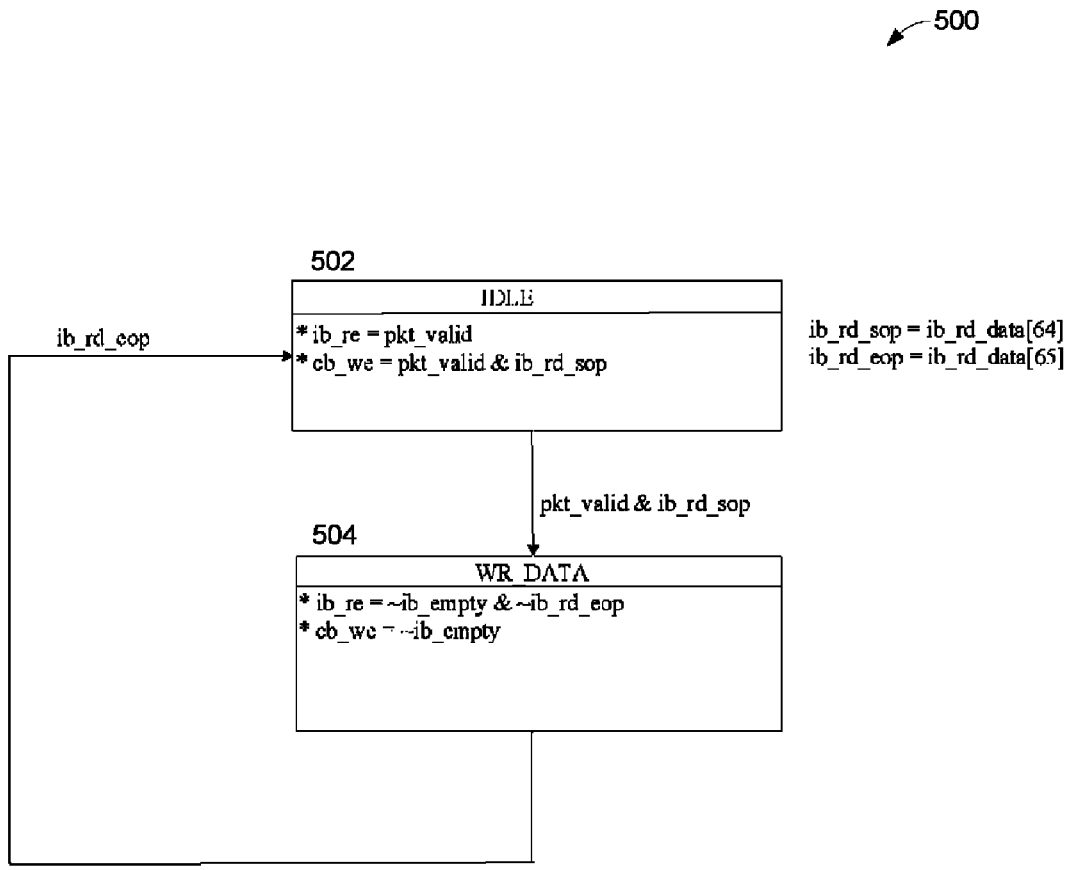
FIG. 5 illustrates one embodiment of the invention showing a packet read out of input buffer with discard forwarding.

FIG. 5 illustrates, generally at 500, one embodiment of the invention showing a Packet Read out of IB with Discard Forwarding. In one embodiment of the invention, after the packet is being forwarded into IB, it will be read out of IB as soon as SOP cycle is detected with pkt_valid assertion. This operation will allow packet forwarding through cut-through with minimum latency. Since discard_normal & discard_trace are embedded into the higher memory bit locations, they will be forwarded the same way as packet data along with SOP, EOP and word pointer indications. The same cut-through operation can also be used on CB read to FB and FB read to packet transmission to minimize packet latency across Switch Fabric to Egress Port. Packet Discard indication will be inspected at Egress Port to determine whether STOMP control symbol shall be issued to cancel the packet.

At 502 is logic block (IDLE) and at 504 write data (WR_DATA). Within each block 502 and 504 are logic equations representing the generation of real-world signals. As may be seen in block 502, if pkt_valid & ib_rd_sop are asserted, it will enter block 504. In block 504, if ib_rd_eop is asserted, it will enter block 502. One of skill in the art will recognize that the signal notations are self explanatory, for example, pkt_valid denotes a packet valid, ib_rd_sop denotes an IB read of SOP signal, etc. The signals also follow standard assertion conventions, for example, pkt_valid will be asserted each time there is a packet being loaded into Input Buffer (as soon as SOP is written), for example, ib_empty is asserted if Input Buffer is empty, etc.

Figure 6:
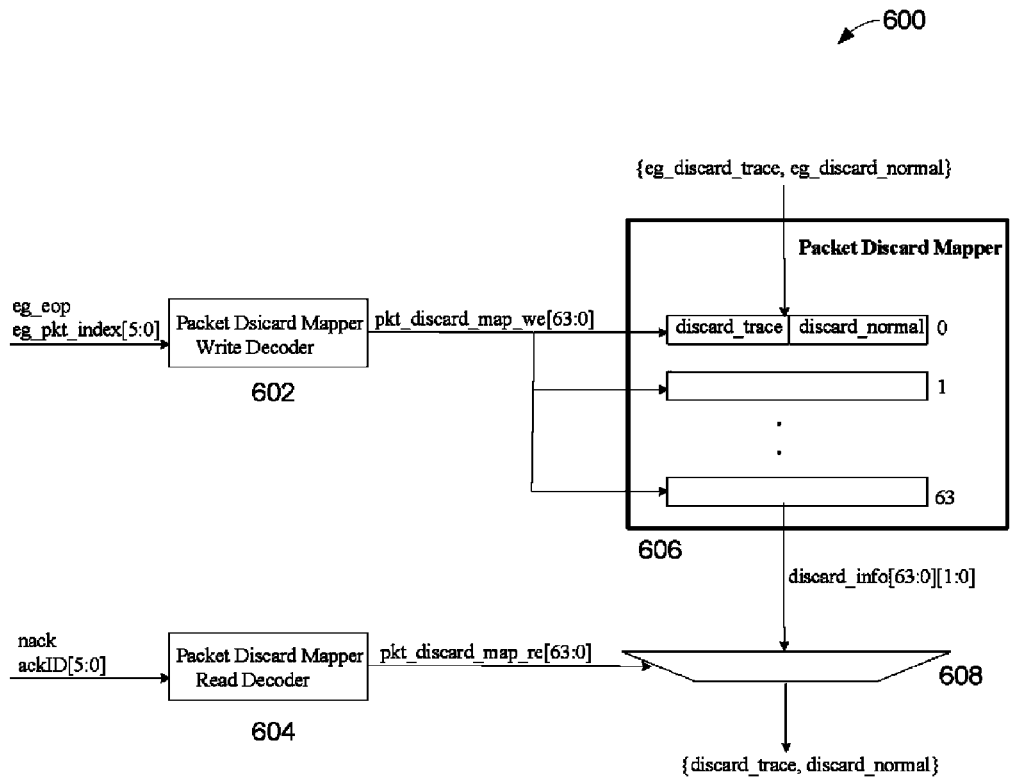
FIG. 6 illustrates one embodiment of the invention showing a packet discard mapper look up.

FIG. 6 illustrates, generally at 600, one embodiment of the invention showing a Packet Discard Mapper Look Up. In one embodiment of the invention, Packet Discard Mapper is used to store packet discard information (discard_normal & discard_trace) while the packet is being transmitted out of the Egress port. The entry of Packet Discard Mapper being used to store packet discard information is selected through Packet Index for the transmitted packet. If neither discard_normal nor discard_trace is set, upon receiving Packet Accepted control symbol (ACK) from its Link Partner, the used memory buffer will be released for future use as the packet has been transmitted successfully. Otherwise, Packet Not Acceptable control symbol (NACK) returned will cause packet retransmission.

In one embodiment of the invention, if any of the discard bit is set while the packet is being transmitted out, based on Egress Port's configuration, STOMP control symbol will be issued to request packet cancellation after packet transmission is completed. For instance, STOMP control symbol will be issued if the Egress Port is configured as a trace port with discard_trace bit set, or STOMP control symbol will be issued if the Egress Port is not configured as a trace port with discard_normal bit set. STOMP control symbol will be issued if both discard_trace and discard_normal are set no matter whether the Egress Port is configured as a trace port or not.

In one embodiment of the invention, after receiving the transmitted packet along with STOMP control symbol, Link Partner will return NACK with ackID to request packet retransmission. The stored packet discard information from Packet Discard Mapper will be retrieved through the returned ackID (can be used to regenerate Packet Index to select the entry from Packet Discard Mapper). If the Egress Port is configured as a trace port with discard_trace bit set, the packet will be discarded by releasing the used memory buffer for future use without retransmitting the packet. Otherwise, if the Egress Port is not configured as a trace port with discard_normal bit set, the used memory buffer will be released the same way without retransmitting the packet either. In case both discard_normal and discard_trace bits are set, packet discard will be performed by releasing the used memory buffer no matter whether the port is configured as a trace port or not. Packet retransmission will not occur either in this case.

At 602 is logic block (Packet Discard Mapper Write Decoder), and at 604 is logic block (Packet Discard Mapper Read Decoder), at 606 is logic block (Packet Discard Mapper), and at 608 is selection of proper {discard_trace, discard_normal}.

Figure 7:
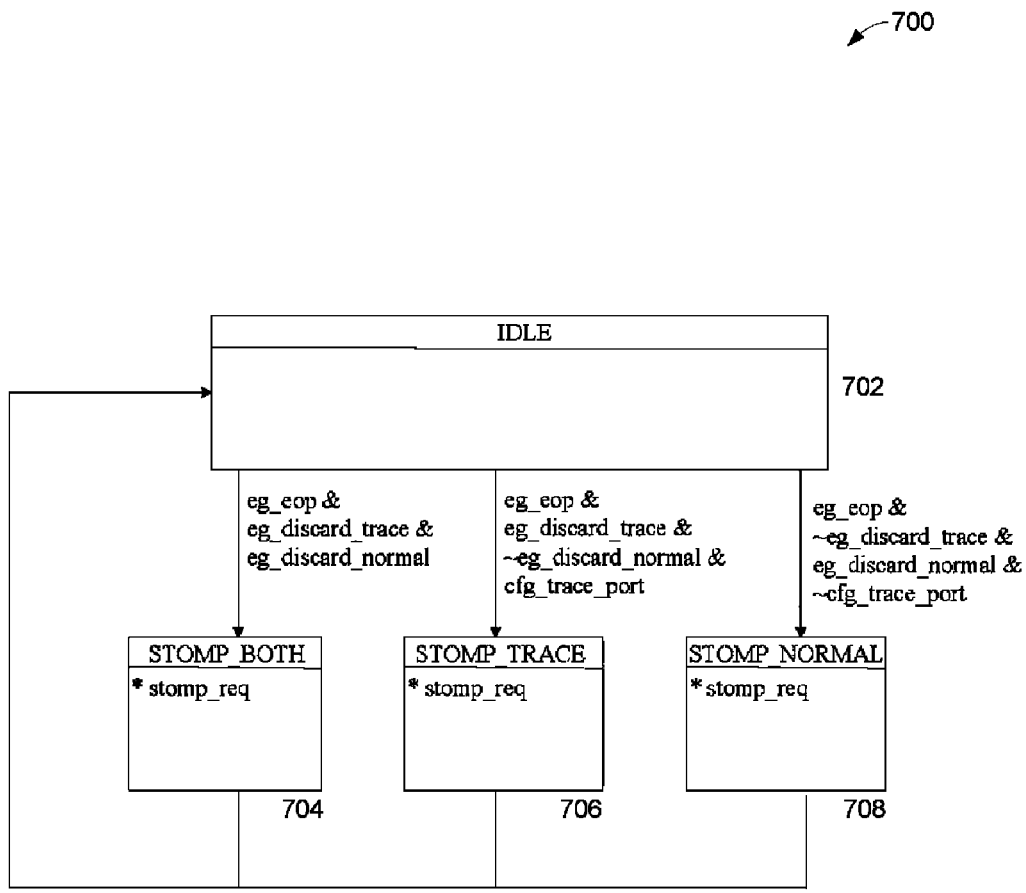
FIG. 7 illustrates one embodiment of the invention showing STOMP control symbol generation.

FIG. 7 illustrates, generally at 700, one embodiment of the invention showing STOMP Control Symbol Generation. In one embodiment of the invention, while the packet is being transmitted out of the Egress Port, discard_normal & discard_trace indications will be checked at EOP cycle. If both bits are set, certain error condition may have been detected therefore STOMP control symbol generation will always be requested to cancel the transmitted packet no matter what Egress Port's configuration is.

In one embodiment of the invention, if discard trace bit is set while the Egress Port is configured as a trace port (cfg_trace_port=1), STOMP control symbol generation will be requested to cancel the transmitted packet as the packet has been forwarded to the trace port but pattern not match occurred while trace is enabled therefore the forwarded packet needs to be cancelled.

In one embodiment of the invention, in case discard_normal bit is set while Egress Port is not configured as a trace port (cfg_trace_port=0), STOMP control symbol generation will be requested to cancel the transmitted packet as the packet has been forwarded to its destination but pattern match occurred with packet filtering enabled therefore the forwarded packet needs to be cancelled.

At 702 is logic block (IDLE), and at 704 is logic block (STOMP_BOTH), at 706 is logic block (STOMP_TRACE), and at 708 is logic block (STOMP_NORMAL). IDLE 702 is exited on the conditions as noted as inputs to 704, 706, and 708. For example, to generate a stomp_req (stomp request) for both trace and normal at 704, the logic condition is eg_eop & eg_discard_trace & eg_discard_normal. Once the stomp_reg is generated (at 704, or 706, or 708) we return to IDLE 702.

Figure 8:
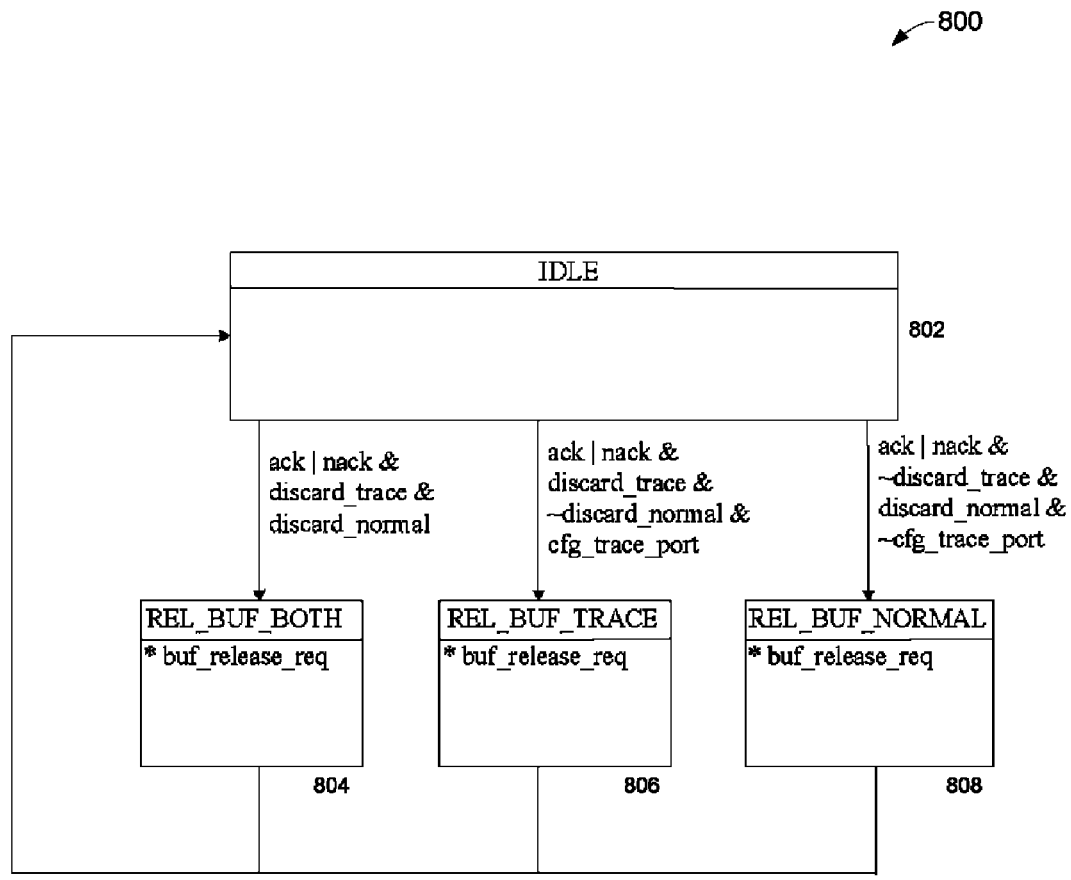
FIG. 8 illustrates one embodiment of the invention showing packet buffer release.

FIG. 8 illustrates, generally at 800, one embodiment of the invention showing Packet Buffer Release. In one embodiment of the invention, packet buffer will always be released if Packet Accepted control symbol (ack) is returned. However, if the packet got discarded through STOMP control symbol, Packet Not Accepted control symbol (NACK) returned may also cause packet buffer release instead of packet retransmission.

In one embodiment of the invention, Packet Not Accepted control symbol (nack) returned in conjunction with ackID can be used to identify the action required for the transmitted packet. The returned ackID (Packet Index) can be used to perform table look up through Packet Discard Mapper. The retrieved discard_trace and discard_normal information will be used to determine whether the used memory buffer can be released as packet retransmission will not be necessary due to packet discard. If both discard_normal & discard_trace are set, it indicates that certain error has been detected during packet reception to Ingress Port's Input Buffer. As a result, memory buffer can be released no matter whether the packet has been forwarded to a normal forwarding port or a trace port. If discard_trace is set with the Egress port being configured as a trace port, memory buffer can also be released as the forwarded packet doesn't have pattern match therefore trace the packet will not be necessary. In case discard_normal is set but the port is not configured as a trace port, it indicates that there is a pattern match therefore packet needs to be filtered out through the normal forwarding port. As a result, the used memory buffer can also be released accordingly.

At 802 is logic block (IDLE), and at 804 is logic block (REL_BUF_BOTH), at 806 is logic block (REL_BUF_TRACE), and at 808 is logic block (REL_BUF_NORMAL). IDLE 802 is exited on the conditions as noted as inputs to 804, 806, and 808. For example, to generate a release the buffer on trace (buf_release_req) at 806, the logic condition is ack | nack & discard_trace & ~discard_normal & cfg_trace_port (ack OR nack AND discard_trace AND (NOT discard_normal) AND cfg_trace_port). As noted the nomenclature is self explanatory in view of Applicant's disclosure so, for example, cfg_trace_port denotes an egress port configured for trace operation.

FIG. 9 illustrates, generally at 900, various embodiments of the invention. In one embodiment of the invention, at 901 is shown Forwarding a packet as soon as a start of packet (SOP) is received. In one embodiment of the invention, at 902 is shown Forwarding a packet as soon as a start of packet (SOP) is received wherein said forwarding begins at an input buffer (IB) and said forwarding next goes to a crosspoint buffer (CB). In one embodiment of the invention, at 903 is shown Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB). In one embodiment of the invention, at 904 is shown Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising adding two bits to said packet at said IB. In one embodiment of the invention, at 905 is shown Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising adding two bits to said packet at said IB further comprising using said two bits to discard a packet based on said two bits. In one embodiment of the invention, at 906 is shown Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising adding one or more bits to said packet at said IB and using said one or more bits to discard said packet at said FB. In one embodiment of the invention, at 907 is shown Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising adding two bits to said packet at said IB further comprising using said two bits to discard a packet based on said two bits wherein said using occurs in said FB. In one embodiment of the invention, at 908 is shown Forwarding a packet as soon as a start of packet (SOP) is received wherein said forwarding begins at an input buffer (IB) and said forwarding next goes to a crosspoint buffer (CB) wherein after said forwarding next goes to said crosspoint buffer (CB) said forwarding next goes to a Final Buffer (FB) further comprising embedding said IB in an Ingress Port, embedding said CB in a Switch Fabric, and embedding said FB in an Egress Port.

FIG. 10 illustrates, generally at 1000, various embodiments of the invention. In one embodiment of the invention, at 1009 is shown adding two bits to a packet; and selectively discarding said packet based on said two bits. In one embodiment of the invention, at 1010 is shown adding two bits to a packet; and selectively discarding said packet based on said two bits further comprising: generating a STOMP signal; and sending said STOMP signal to a link partner. In one embodiment of the invention, at 1011 is shown adding two bits to a packet; and selectively discarding said packet based on said two bits further comprising: generating a STOMP signal; and sending said STOMP signal to a link partner 10 further comprising releasing a buffer memory based on said two bits. In one embodiment of the invention, at 1012 is shown adding two bits to a packet; and selectively discarding said packet based on said two bits further comprising: generating a STOMP signal; and sending said STOMP signal to a link partner further comprising releasing a buffer memory based on said two bits further comprising releasing a buffer memory in response to a response from said link partner. In one embodiment of the invention, at 1013 is shown adding two bits to a packet; and selectively discarding said packet based on said two bits further comprising: generating a STOMP signal; and sending said STOMP signal to a link partner further comprising releasing a buffer memory based on said two bits further comprising releasing a buffer memory in response to a response from said link partner wherein said response comprises a not acknowledge (NACK) and an acknowledgement identification (ackID). In one embodiment of the invention, at 1014 is shown adding two bits to a packet; and selectively discarding said packet based on said two bits further comprising: generating a STOMP signal; and sending said STOMP signal to a link partner further comprising releasing a buffer memory based on said two bits further comprising releasing a buffer memory in response to a response from said link partner wherein said response comprises a not acknowledge (NACK) and an acknowledgement identification (ackID) wherein said releasing said buffer memory in response to said response from said link partner is based on a combination consisting of said NACK, said ackID, and NACK and ackID.

FIG. 11 illustrates, generally at 1100, various embodiments of the invention. In one embodiment of the invention, at 1120 is shown forwarding a packet through a switch as soon as a Start Of Packet delimiter (SOP) is received for said packet; inserting one or more discard bits at an End of Packet (EOP) cycle for said packet wherein said one or more discard bits request said packet cancellation upon a condition selected from the group consisting of a pattern not match with trace enabled, a pattern match with packet filter enabled, and any detected error; storing said one or more discard bits in a memory, wherein said storing is to a memory location indexed through a transmitted packet index; generating a STOMP Control Symbol based on said one or more discard bits and a configuration of said EP, wherein said STOMP Control Symbol requests a Link Partner to cancel said packet; receiving from said Link Partner a Not Accepted Control Symbol (NACK) along with an ACK ID; and retrieving said stored said one or more discard bits from said memory; comparing said retrieved said stored said one or more discard bits from said memory against said configuration of said EP; and releasing said memory used to store said one or more discard bits and discarding said packet. In one embodiment of the invention, at 1121 is shown additionally, further comprising: receiving said packet on an n-port Switch, said n-port switch consisting of n Ingress Ports (IP) wherein each of said n IP has an Input Buffer (IB) for said packet reception; storing said received packet into one of said n IB; forwarding said received packet to one or more n Crosspoint Buffers (CB), wherein each of said n CB corresponds to a corresponding n Egress Port; forwarding said received packet from said one or more n CB through one or more said n Egress Port to one or more Link Partner, wherein each of said n Egress Port has a Final Buffer. In one embodiment of the invention, at 1122 is shown additionally, wherein said pattern not match with trace enabled, and said pattern match with packet filter enabled, and said any detected error are performed after said SOP received for said packet. In one embodiment of the invention, at 1130 is shown additionally, wherein said one or more discard bits are discard_normal and discard_trace and wherein said storing is during a time when said packet is being transmitted out of said EP and wherein said storing is selected through said transmitted packet index for a transmitted said packet. In one embodiment of the invention, at 1133 is shown additionally, wherein said one or more discard bits are two bits denoted discard_trace and discard_normal and wherein said switch has one or more ports. In one embodiment of the invention, at 1131 is shown additionally, further comprising: generating said Not Accepted Control Symbol (NACK) and said ACK ID in response to said Link Partner receiving said STOMP Control Symbol, wherein said ACK ID is a packet index; and requesting retransmission of said packet based upon said packet index. In one embodiment of the invention, at 1132 is shown additionally, wherein retrieving said stored said one or more discard bits from said memory is from said EP based upon said packet index; and wherein said releasing said memory used to store said one or more discard bits and discarding said packet is based upon a logic condition selected from the group consisting of discard_trace is set and said EP is configured as a trace port, discard_normal is set and said EP is not configured as a trace port, and discard_trace is set and discard_normal is set.

FIG. 12 illustrates, generally at 1200, various embodiments of the invention. In one embodiment of the invention, at 1220 is shown forwarding a packet through a switch as soon as a Start Of Packet delimiter (SOP) is received for said packet; inserting one or more discard bits at an End of Packet (EOP) cycle for said packet wherein said one or more discard bits request said packet cancellation upon a condition selected from the group consisting of a pattern not match with trace enabled, a pattern match with packet filter enabled, and any detected error; storing said one or more discard bits in a memory, wherein said storing is based on said one or more discard bits and configuration of an Egress Port (EP) and said one or more discard bits are indexed through a transmitted packet index; generating a STOMP Control Symbol based on said one or more discard bits and said configuration of said EP, wherein said STOMP Control Symbol requests a Link Partner to cancel said packet; receiving from said Link Partner a Not Accepted Control Symbol (NACK) along with an ACK ID; and retrieving said stored said one or more discard bits from said memory; comparing said retrieved said stored said one or more discard bits from said memory against said configuration of said EP; and releasing said memory used to store said one or more discard bits and discarding said packet. In one embodiment of the invention, at 1221 is shown additionally, further comprising: receiving said packet on an n-port Switch, said n-port switch consisting of n Ingress Ports (IP) wherein each of said n IP has an Input Buffer (IB) for said packet reception; storing said received packet into one of said n IB; forwarding said received packet to one or more n Crosspoint Buffers (CB), wherein each of said n CB corresponds to a corresponding n Egress Port; forwarding said received packet from said one or more n CB through one or more said n Egress Port to one or more Link Partner, wherein each of said n Egress Port has a Final Buffer. In one embodiment of the invention, at 1223 is shown additionally, wherein said configuration of an Egress Port is selected from the group consisting of a normal forwarding port, and a trace port. In one embodiment of the invention, at 1224 is shown additionally, further comprising: setting a discard_trace bit when said condition pattern not match with trace enabled exists; and discarding said received packet forwarded to said trace port when said discard_trace bit is set. In one embodiment of the invention, at 1227 is shown additionally, further comprising: transmitting said generated STOMP Control Symbol from said EP to said Link Partner after said packet has been transmitted from said EP to said Link Partner. In one embodiment of the invention, at 1225 is shown additionally, further comprising: setting a discard_normal bit when said condition pattern match with packet filter enabled exists; and discarding said received packet forwarded to said normal forwarding port when said discard_normal bit is set. In one embodiment of the invention, at 1228 is shown additionally, further comprising: transmitting said generated STOMP Control Symbol from said EP to said Link Partner after said packet has been transmitted from said EP to said Link Partner. In one embodiment of the invention, at 1226 is shown additionally, further comprising: setting a discard_normal bit when said condition any detected error exists; setting a discard_trace bit when said condition any detected error exists; discarding said received packet forwarded to said trace port when said discard_trace bit is set and said discard_trace bit is set; and discarding said received packet forwarded to said normal forwarding port when said discard_trace bit is set and said discard_trace bit is set. In one embodiment of the invention, at 1229 is shown additionally, further comprising: transmitting said generated STOMP Control Symbol from said EP to said Link Partner after said packet has been transmitted from said EP to said Link Partner.

One of skill in the art will appreciate that variations of the invention are possible and within the teaching of the disclosure but not explicitly described. For example, adding 2 bits to the packet for discard information has been described, however, the invention is not so limited and the bits appended could be 3 or more. The savings with 3 bits are still significant with respect to 18 normally required as discussed above. Likewise a single bit could be used but would not allow for detailing aspects of discard, simply to discard.

One of skill in the art will appreciate that variations of the invention are possible and within the teaching of the disclosure but not explicitly described. For example, the above description used an 18 port switch to illustrate the techniques of the present invention, however the invention is not so limited and may be used with any size switch with any number of ports. One of skill in the art will appreciate that using the techniques disclosed only 2 discard bits are needed regardless of the switch size or the number of ports.

Applicant has described a STOMP control symbol and its generation which is used to request cancellation of a transmitted packet (e.g. from a Link Partner). One of skill in the art will understand that this STOMP signal may be called by any other name and should not be limited by its name but rather by its functionality as described.

Thus a method and apparatus for selective packet discard have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
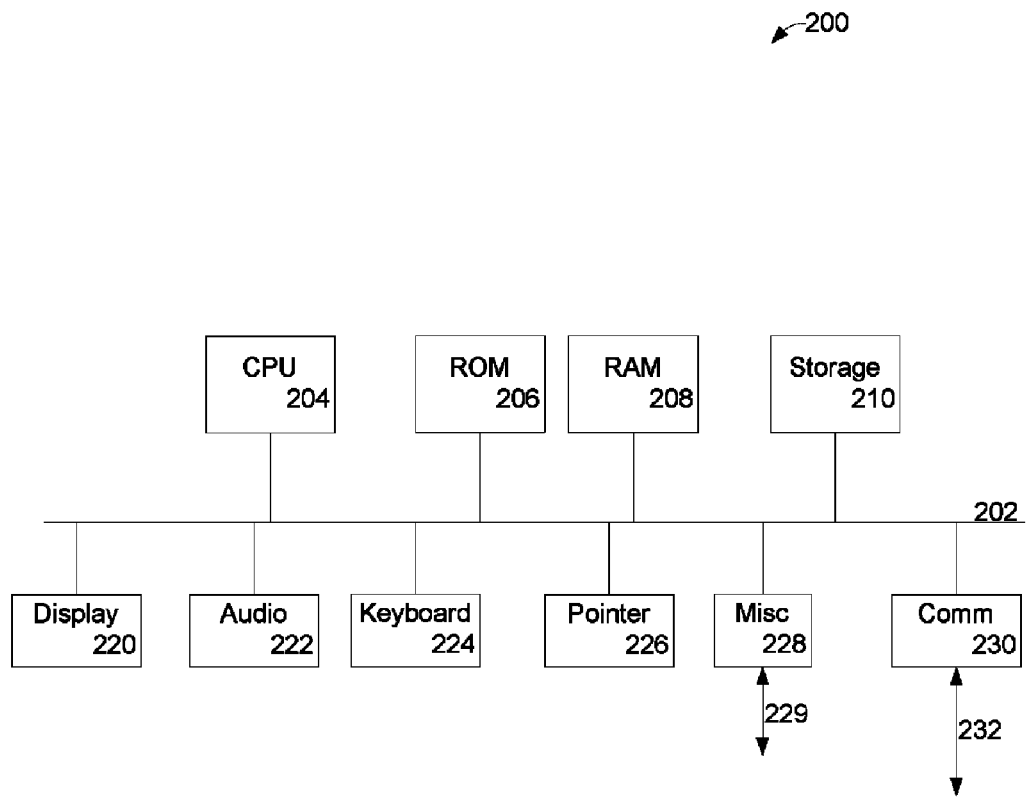
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Various spellings may be used for terms used in the description. These variations are to be understood to relate to the same term unless denoted otherwise. For example: cut-through also spelled cut through; stomp is also spelled STOMP; etc.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for selective packet discard have been described.

What is claimed is:

1. A method comprising:
   forwarding a packet through a switch as soon as a Start Of Packet delimiter (SOP) is received for said packet;
   inserting one or more discard bits at an End of Packet (EOP) cycle for said packet wherein said one or more discard bits request said packet cancellation upon a condition selected from the group consisting of a pattern not match with trace enabled, a pattern match with packet filter enabled, and any detected error;
   storing said one or more discard bits in a memory, wherein said storing is to a memory location indexed through a transmitted packet index;
   generating a STOMP Control Symbol based on said one or more discard bits and a configuration of an Egress Port (EP), wherein said STOMP Control Symbol requests a Link Partner to cancel said packet;
   receiving from said Link Partner a Not Accepted Control Symbol (NACK) along with an Acknowledgement Indentification (ACK ID); and
   retrieving said stored said one or more discard bits from said memory;
   comparing said retrieved said stored said one or more discard bits from said memory against said configuration of said EP; and
   releasing said memory used to store said one or more discard bits and discarding said packet.

2. The method of claim 1 further comprising:
   receiving said packet on an n-port Switch, said n-port switch consisting of n Ingress Ports (IP) wherein each of said n IP has an Input Buffer (IB) for said packet reception;
   storing said received packet into one of said n IB;
   forwarding said received packet to one or more n Crosspoint Buffers (CB), wherein each of said n CB corresponds to a corresponding n Egress Port;
   forwarding said received packet from said one or more n CB through one or more said n Egress Port to one or more Link Partner, wherein each of said n Egress Port has a Final Buffer.

3. The method of claim 1 wherein said pattern not match with trace enabled, and said pattern match with packet filter enabled, and said any detected error are performed after said SOP received for said packet.

4. The method of claim 2 wherein said configuration of said Egress Port is selected from the group consisting of a normal forwarding port, and a trace port.

5. The method of claim 4 further comprising:
   setting a discard_trace bit when said condition pattern not match with trace enabled exists; and
   discarding said received packet forwarded to said trace port when said discard_trace bit is set.

6. The method of claim 4 further comprising:
   setting a discard_normal bit when said condition pattern match with packet filter enabled exists; and
   discarding said received packet forwarded to said normal forwarding port when said discard_normal bit is set.

7. The method of claim 4 further comprising:
   setting a discard_normal bit when said condition any detected error exists;
   setting a discard_trace bit when said condition any detected error exists;
   discarding said received packet forwarded to said trace port when said discard_trace bit is set and said discard_trace bit is set; and
   discarding said received packet forwarded to said normal forwarding port when said discard_trace bit is set and said discard_trace bit is set.

8. The method of claim 5 further comprising:
   transmitting said generated STOMP Control Symbol from said EP to said Link Partner after said packet has been transmitted from said EP to said Link Partner.

9. The method of claim 6 further comprising:
   transmitting said generated STOMP Control Symbol from said EP to said Link Partner after said packet has been transmitted from said EP to said Link Partner.

10. The method of claim 7 further comprising:
    transmitting said generated STOMP Control Symbol from said EP to said Link Partner after said packet has been transmitted from said EP to said Link Partner.

11. The method of claim 1 wherein said one or more discard bits are discard_normal and discard_trace and wherein said storing is during a time when said packet is being transmitted out of said EP and wherein said storing is selected through said transmitted packet index for a transmitted said packet.

12. The method of claim 1 further comprising:
    generating said Not Accepted Control Symbol (NACK) and said ACK ID in response to said Link Partner receiving said STOMP Control Symbol, wherein said ACK ID is a packet index; and
    requesting retransmission of said packet based upon said packet index.

13. The method of claim 12 wherein retrieving said stored said one or more discard bits from said memory is from said EP based upon said packet index; and wherein said releasing said memory used to store said one or more discard bits and discarding said packet is based upon a logic condition selected from the group consisting of discard_trace is set and said EP is configured as a trace port, discard_normal is set and said EP is not configured as a trace port, and discard_trace is set and discard_normal is set.

14. The method of claim 1 wherein said one or more discard bits are two bits denoted discard_trace and discard_normal and wherein said switch has one or more ports.

* * * * *